Sept. 20, 1927.

G. H. HUFFERD 1,643,017

UNIVERSAL COUPLING

Filed Feb. 26, 1926     2 Sheets-Sheet 1

INVENTOR:
GEORGE H. HUFFERD
BY
ATTORNEY.

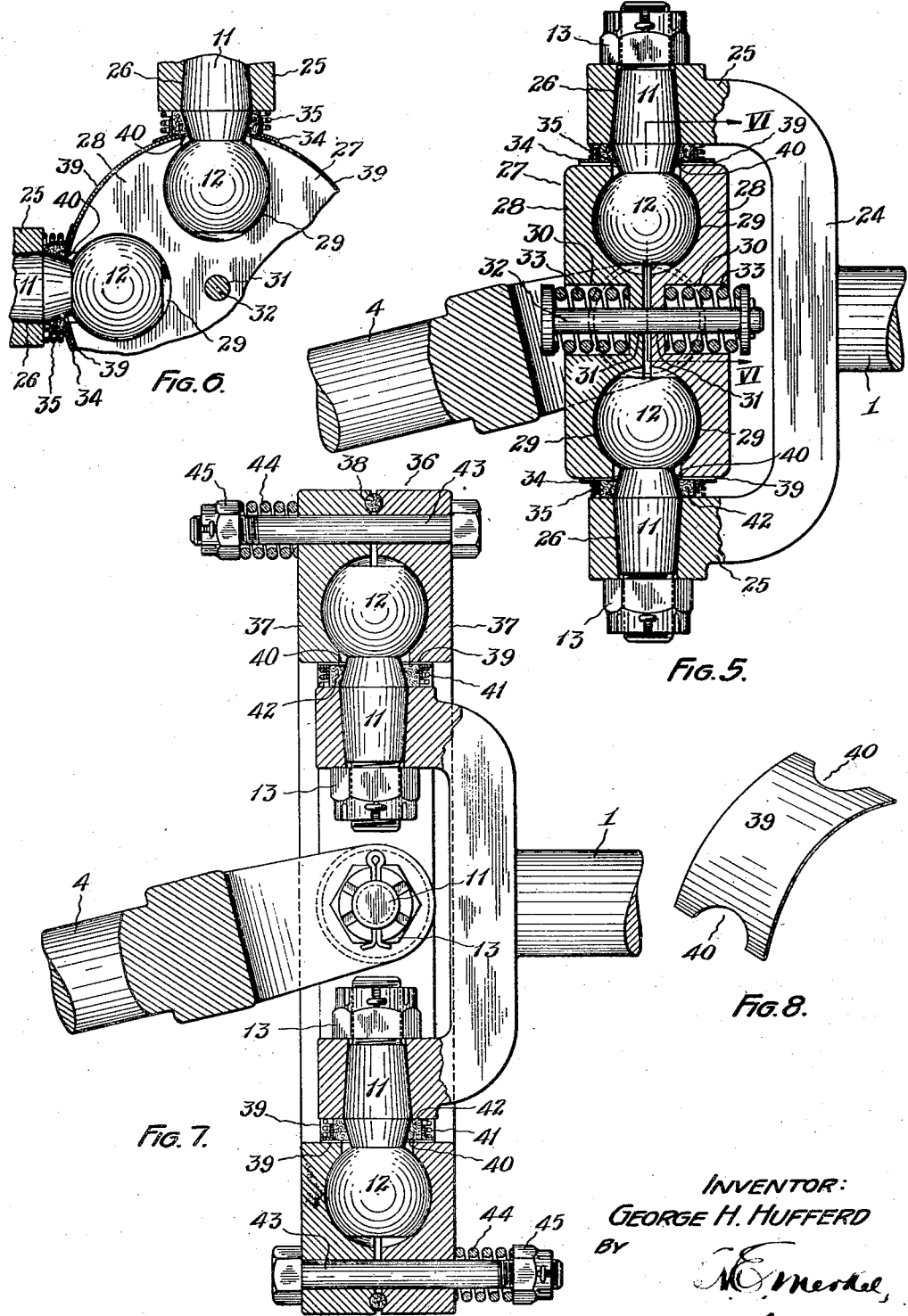

Patented Sept. 20, 1927.

1,643,017

UNITED STATES PATENT OFFICE.

GEORGE H. HUFFERD, OF DETROIT, MICHIGAN, ASSIGNOR TO THOMPSON PRODUCTS INC., OF CLEVELAND, OHIO, A CORPORATION OF OHIO.

UNIVERSAL COUPLING.

Application filed February 26, 1926. Serial No. 90,843.

The invention relates to universal couplings, adapted to transmit rotary motion from a driving member, such as an engine shaft, to a driven shaft, such as the transmission shaft of an automobile which gives rotary motion to the rear axles.

Universal couplings have been constructed in many different forms, many of which are complicated and expensive to manufacture. It is the object of this invention to lower the cost of such a coupling, while retaining the desirable factors of safety and durability. To this end I utilize, as a feature of my invention, the ball stud commonly employed in connecting rods and drag links. According to this invention the shank of such a ball stud is rigidly connected to one of the rotating parts and the ball is connected to the other part for universal motion thereon.

The invention may be embodied in many different forms, but for the purpose of explaining the principles involved in the invention I disclose herein three forms of embodiment, any one of which may be preferred according to the situation in which it is to be employed.

In the annexed drawings:

Fig. 5 is a vertical section through a modified form of coupling in which the ball studs are radially arranged;

Fig. 6 is a section on line VI—VI of Fig. 5, through two adjacent ball studs, one connected with the driving member and the other with the driven member;

Fig. 7 is a vertical section through a third modification, in which the intermediate member is placed outside of the yokes connected with the driving and driven members;

Fig. 8 is a perspective view of a segmental dust shield employed in the form illustrated in Figs. 6 and 7.

Figures 2, 4:
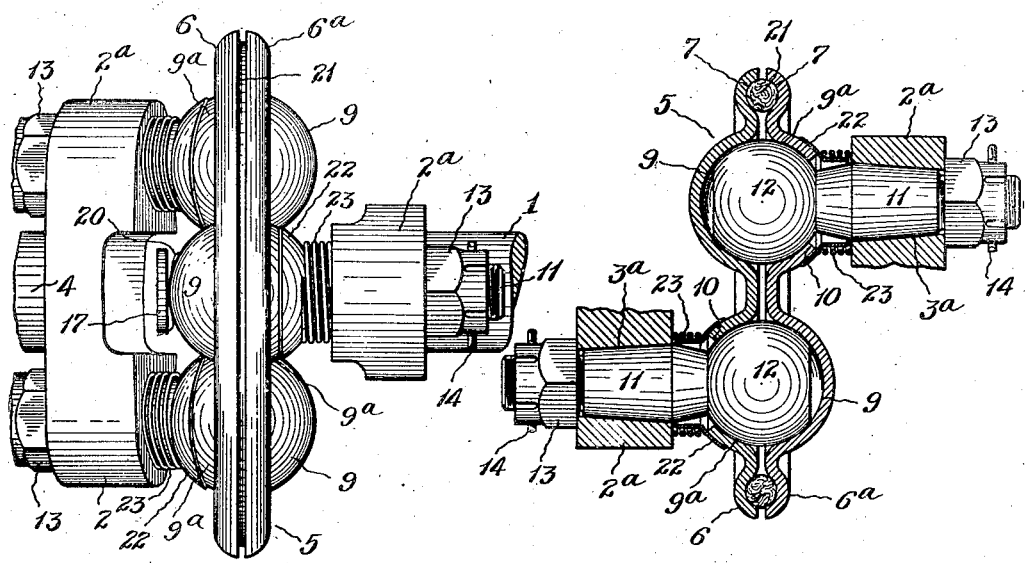
Fig. 2 is a plan view of the coupling shown in Fig. 1.
Fig. 4 is a vertical section on line IV—IV of Fig. 3 through two adjacent ball studs, one connected with the driving member and the other with the driven member.
Figures 1, 3:
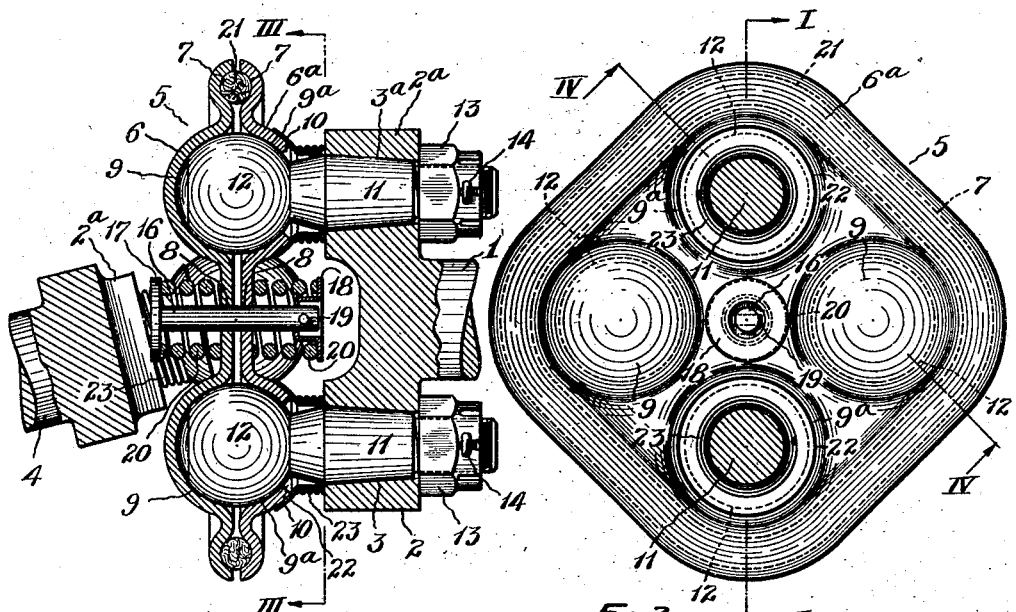
Figure 1 is a vertical section taken on line I—I of Fig. 3 through one form of coupling made in accordance with this invention.
Fig. 3 is a vertical cross-section taken on line III—III of Fig. 1.

Referring to the drawings in detail, in which the same reference numeral is used throughout to designate the same part, and more particularly to Figs. 1 to 4 which illustrate the form preferred for most situations, a driving shaft 1 is provided at its end with radial diametrically opposed arms 2, $2^a$ provided with apertures 3, $3^a$, and a driven shaft 4 is provided with like arms. An intermediate member designated generally by 5, serves to connect the driving and driven members. This intermediate member is composed of two mating metallic plates 6, $6^a$, of any suitable contour, near the margin of each of which is preferably formed an annular groove 7, and at the center of which is an aperture 8. Between the center of each plate and the annular groove 7, the plate is provided with spherically curved ball seats 9, $9^a$, the ball seats 9 being hemispherical and arranged diametrically opposite each other, and the diametrically arranged ball seats $9^a$ being the segments of spheres by reason of an aperture 10 formed therein for the passage of the shank 11 of a ball stud, the ball 12 of which is adapted to have bearing in the ball seats. When the plates 6, $6^a$, are properly arranged an apertured ball seat $9^a$ is opposed to a hemispherical ball seat 9, and alternate ball studs engaged therein at 90° apart have their shanks projecting in opposite directions in longitudinal planes. The shanks 11 of the ball studs enter the apertures 3, $3^a$ in the arms of the driving and driven members and are secured in place preferably by nuts 13 threaded onto the ends of the shanks, locked in place by a cotter pin 14.

Continued motion of the ball 12 in the ball seats causes wear and consequent looseness in the ball joint which it is desirable to take up automatically. For this purpose, as originally assembled, the ball 12 will be of a size to space the plates 6, $6^a$ slightly apart; the plates are provided with the apertures 8 at the center, through which passes a tension bolt 16 having a spring abutment 17 at one end and a spring retaining cup 18 at its opposite end, held in place by a removable pin 19, and coil springs 20 are interposed between the abutment 17 and plate 6, and the retaining cup 18, and plate $6^a$, whereby the ball seats are constantly pressed into engagement with the balls 12, i. e., the plates are biased toward each other whereby wear in the ball joint is automatically taken up.

In order to prevent the entrance of dust and dirt into the ball joint an annular washer 21 of rubber, felt, or other resilient material is engaged in the annular grooves 7, and a dust cover 22 (Figs. 1 and 4) surrounds the shank 11 of the ball stud and engages the outer surface of the segmental ball seat 9ª, a coil spring 23 abutting an arm 2, 2ª at one end and the plate at the other end serving to keep the dust cover in place. It should be observed that the engaging surfaces between the dust cover 22 and ball seat 9ª are spherically curved thereby to accommodate these parts to the relative motion between the intermediate and driving or driven members.

In the form of the invention above described the ball studs have their shanks arranged longitudinally, i. e., in planes generally parallel to the axes of the driving and driven members. It is within the scope of this invention to arrange the ball studs with their shanks radial to the driving and driven members, of which I show two arrangements, in Figs. 5 and 6, and 7 and 8, respectively.

As illustrated in Figs. 5 and 6 the ends of the driving and driven members are provided with yokes 24 having arms 25 parallel with the axes of the shafts and diametrically opposed, provided with radial apertures 26 in which are rigidly secured the shanks of the ball studs. Located between the arms 25 of the yokes is an intermediate member 27 having the same general characteristics as the intermediate member 5, above described, consisting of mating sections 28 having spherically curved ball seats 29 to receive the balls of the ball studs, the shanks of which project radially outwardly through the apertures 26 in the arms of the yoke 24. In this case the mating sections are each formed preferably from solid material, provided at the center with spring receiving recesses 30, and with a pin receiving aperture 31 of smaller diameter, extending from the bottom of the recess to the inner face of the section. The sections 28 are connected by a tension bolt 32 provided with a fixed spring abutment at one end and a removable spring abutment at the other end, similar to that above described, between which abutments and the bottoms of the recesses 30 are confined coil springs 33. The conjoint action of the parts is similar to that above described in connection with the embodiment shown in Figs. 1 to 4. In this embodiment the ball joint is exposed to the entrance of dust at the outer margin only, to preclude which dust covers 34 are provided having flanged bases of cylindrical curvature to conform to the curvature of the outer edges of the mating sections 28 and associated with coil springs 35 as above described.

In Fig. 7 is illustrated another form, similar to the form just described except that the intermediate member is placed outside the yokes on the driving and driven members, this arrangement involving slight changes in detail. As in the form just described the shanks of the ball studs are rigidly secured in the arms of the yokes but the balls are placed on the outside instead of the inside of the yokes. To accommodate this arrangement the intermediate member 36 is composed of two mating sections 37 of annular form, in which the balls of the ball studs have bearing. In this form the bearings are exposed at their outer ends, for which reason an annular washer 38 is set into annular registering grooves in the mating sections, similar to the arrangement illustrated in Figs. 1 to 4. The inner side of the bearing is protected by segmental dust plates 39 (Fig. 8), curved to fit the inner walls of the mating sections and having recesses 40 at their ends which engage the curved shanks of the ball studs, coil springs 41 engaging the yokes and the plates and holding the latter in position. Whenever it is found desirable, in these several forms, felt washers 42, such as illustrated in Fig. 7, are inserted between the connected parts and above the shanks of the ball stud. In this form of construction the mating sections of the intermediate member are biased toward each other by any suitable resilient means. In connection with this form I have shown a biasing means of a construction somewhat differing from those heretofore described. As shown, bolts 43 are employed which pass through registering apertures in the mating sections near the margins thereof, and springs 44 surround the threaded ends of the bolts in abutting relation to the outer face of a mating section and nuts 45 to constantly draw the mating sections together.

From the above description it will be apparent that I have devised a universal coupling that is safe and durable and which may be manufactured at a low cost. While I have disclosed several embodiments of the invention, it is obvious that it may be embodied in other forms and that the various details may be changed without departing from the principles herein disclosed. It is therefore to be understood that the invention is not confined to the details shown but includes all structures comprehended within the terms of the appended claims.

What I claim is:

1. A universal coupling comprising driving and driven members each having radial arms at its ends, an intermediate member adapted to transmit rotary motion from the driving to the driven member consisting of two mating parts each having spherically curved ball seats, ball studs having their balls seated in the ball seats and with the shanks of alternate ball studs connected to the driving and driven members, respectively, the ball being of a diameter to slightly space apart the mating parts of the intermediate member, and yielding means constantly pressing the mating parts toward each other.

2. In a universal coupling an intermediate member comprising two mating plates each provided with hemispherical ball seats, the ball seats of opposed plates facing each other to form spherical ball seats, and yielding means biasing the plates toward each other.

3. In a universal coupling an intermediate member comprising two mating plates each provided with hemispherical ball seats, the ball seats of opposed plates facing each other to form spherical ball seats, an annular groove in the margin of each plate adapted to cooperate with each other to form an annular washer-receiving chamber.

4. In a universal coupling an intermdiate member comprising two mating plates each provided with hemispherical ball seats, the ball seats of opposed plates facing each other to form spherical ball seats, and yielding means biasing the plates toward each other consisting of a pin passing centrally through the plates and having abutments at opposite ends and coil springs between the abutments and the plates.

Signed by me this 22nd day of January, 1926.

GEORGE H. HUFFERD.